US009129529B2

(12) United States Patent
Kellermann et al.

(10) Patent No.: US 9,129,529 B2
(45) Date of Patent: Sep. 8, 2015

(54) TRAFFIC MANAGEMENT SYSTEM

(71) Applicant: SIEMENS AKTIENGESELLSCHAFT, Munich (DE)

(72) Inventors: Astrid Kellermann, Munich (DE); Roland Wunder, Koenigsbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/206,195

(22) Filed: Mar. 12, 2014

(65) Prior Publication Data

US 2014/0266796 A1 Sep. 18, 2014

(30) Foreign Application Priority Data

Mar. 12, 2013 (DE) ........................ 10 2013 204 224

(51) Int. Cl.
*G08G 1/09* (2006.01)
*G08G 1/0967* (2006.01)
(Continued)

(52) U.S. Cl.
CPC ........ *G08G 1/096775* (2013.01); *G08G 1/0116* (2013.01); *G08G 1/0133* (2013.01); *G08G 1/0141* (2013.01); *G08G 1/0145* (2013.01); *G08G 1/096716* (2013.01); *G08G 1/096741* (2013.01)

(58) Field of Classification Search
USPC .................... 340/905, 934; 455/456.3, 414.1; 701/117, 118
See application file for complete search history.

(56) References Cited

U.S. PATENT DOCUMENTS 6,177,886 B1 * 1/2001 Billington et al. ............ 340/934
6,317,682 B1 11/2001 Ogura et al.
(Continued)

FOREIGN PATENT DOCUMENTS

DE 19843203 A1 3/2000
DE 10200002 A1 8/2002
(Continued)

OTHER PUBLICATIONS

SITRAFFIC Concert, SITRAFFIC Scala und SITRAFFIC Guide; Drei Aufgaben—eine gemeinsame Plattform; Traffic Solutions, Siemens, pp. 1-26.
(Continued)

*Primary Examiner* — Jack K Wang
(74) *Attorney, Agent, or Firm* — Laurence A. Greenberg; Werner H. Stemer; Ralph E. Locher

(57) ABSTRACT

A traffic management system provides traffic information and allows controlling and influencing traffic in a traffic network, such as a street network in a city. The system includes a traffic management center with a generator for the central creation of an information message for road users. The traffic management system includes terminals to be carried along by the road users for receiving and outputting the information message. Data transmitters transfer the information message from the traffic management center to the terminal. The generators are configured to localize the information message by assigning a location code for destination-oriented transmission and/or output of the located information message. The location code represents a location or section of the traffic network relating to the information message. The road user on the move within the traffic network can be provided directly and explicitly with up-to-date information messages.

13 Claims, 1 Drawing Sheet

(51) Int. Cl.

| | |
|---|---|
| ***G08G 1/01*** | (2006.01) |
| *G08G 1/065* | (2006.01) |
| *H04W 24/00* | (2009.01) |
| *H04M 1/68* | (2006.01) |
| *G06F 19/00* | (2011.01) |

(56) References Cited

U.S. PATENT DOCUMENTS

| | | | | |
|---|---|---|---|---|
| 8,781,716 | B1 * | 7/2014 | Wenneman et al. | 701/118 |
| 2004/0263357 | A1 * | 12/2004 | Hamilton | 340/936 |
| 2005/0003802 | A1 * | 1/2005 | Joseph | 455/414.1 |
| 2009/0192851 | A1 * | 7/2009 | Bishop | 705/7 |
| 2010/0156670 | A1 * | 6/2010 | Hamilton et al. | 340/928 |
| 2011/0034183 | A1 | 2/2011 | Haag et al. | |
| 2011/0043377 | A1 | 2/2011 | McGrath et al. | |
| 2012/0083960 | A1 * | 4/2012 | Zhu et al. | 701/23 |

FOREIGN PATENT DOCUMENTS

| | | | |
|---|---|---|---|
| EP | 0817151 | A1 | 1/1998 |
| EP | 0982698 | A2 | 3/2000 |
| EP | 1006684 | A2 | 6/2000 |
| FR | 2857490 | A1 | 1/2005 |

OTHER PUBLICATIONS

Evangelia Kokolaki et al., "Opportunistically assisting parking service discovery: Now it helps, now it does", Pervasive and Mobile Computing vol. 8, No. 2, Apr. 1, 2012, pp. 210-227, XP055127387, ISSN: 1574-1192.

* cited by examiner

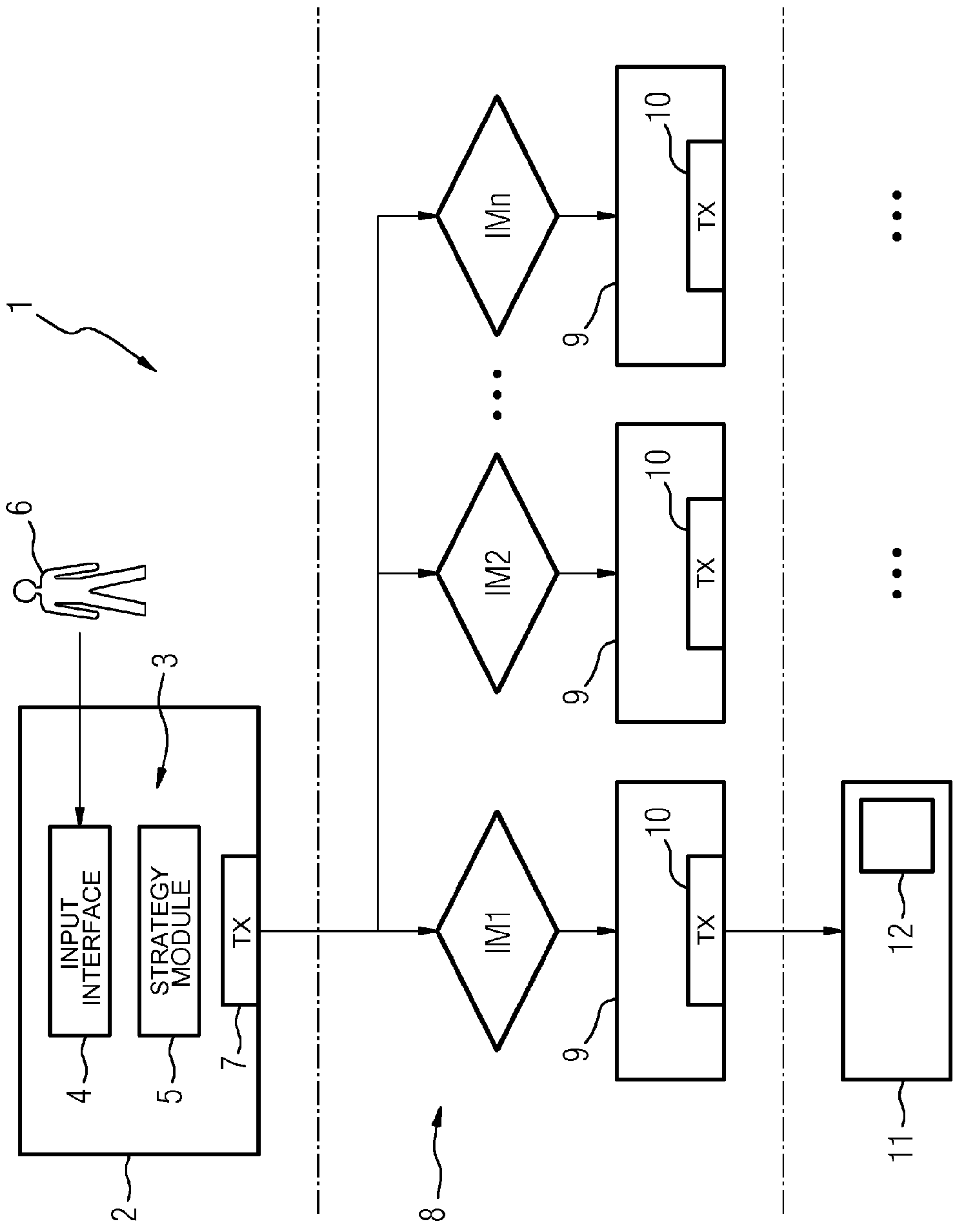
1
6
3
INPUT INTERFACE
STRATEGY MODULE
TX
4
5
7
2
8
IM1
IM2
IMn
9
10
TX
11
12

TRAFFIC MANAGEMENT SYSTEM

CROSS-REFERENCE TO RELATED APPLICATION

This application claims the priority, under 35 U.S.C. §119, of German application DE 102013204224.8, filed Mar. 12, 2013; the prior application is herewith incorporated by reference in its entirety.

BACKGROUND OF THE INVENTION

Field of the Invention

The invention relates to a traffic management system for providing traffic information and for controlling and influencing traffic in a traffic network, especially in a street network of a city. The traffic management system includes a traffic management center with means for central creation of an information message for road users. A terminal that road users are able to carry with them receives and outputs the information message. Data transmission means transfers the information message from the traffic management center to the terminal. The creation means are configured for location of the information message by assigning a location code for destination-oriented transfer and/or output of the located information message, wherein the location code represents a location or section of the traffic network relating to the information message.

A traffic management system of this type is known from the product brochure "SITRAFFIC Concert, SITRAFFIC Scala and SITRAFFIC Guide: Three tasks—one common platform", published in 2008 by Siemens AG, Order No. E10003-A800-A64-V1. The traffic management center possesses open interfaces to systems of strategic relevance for traffic, such as the fire department control centers, municipal roadworks systems, central parking facilities, traffic signal systems of construction offices, central offices of transport operators or management systems of sport arenas and other exhibition locations, in order to enable their data material to be used for strategic traffic management. Open interfaces are also used however to pass on reliable traffic information to a wide variety of external service providers. Based on this data, navigation systems can guide their users safely and on the fastest route to the destination and, in doing so, can automatically take account of congestion and diversions. Congestion warnings, traffic information and journey time calculations disseminated by Internet and radio also help to find the most favorable route in terms of traffic management. In addition the traffic management center offers a way of directly influencing dynamic display boards with recommended diversions, ice, fog or congestion warnings and speed limits.

Generic traffic management systems are described, for example, in patent application publication US 2011/0034183 A1 and in German published patent application DE 102 00 002 A1.

Dynamic roadside information boards, news radio and the so-called TMC service of the Radio Data System have less flexibility and a restricted performance in respect of the content of the information messages. The Internet is not tailored to the individual road users and to the local relevance of the respective information.

SUMMARY OF THE INVENTION

It is accordingly an object of the invention to provide a traffic management system which overcomes the above-mentioned disadvantages of the heretofore-known devices and methods of this general type and which provides for a traffic management system of the type described above, with which a road user on the move in the traffic network can be provided directly and explicitly with up-to-date information messages.

With the foregoing and other objects in view there is provided, in accordance with the invention, a traffic management system for providing traffic information and for controlling and influencing traffic in a traffic network, especially a traffic network in a city or a metropolitan area. The traffic management system comprises:

a traffic management center including a generator for centrally creating an information message for road users, the generator being configured to localize the information message by assigning a location code for destination-oriented transfer and/or output of the localized information message, wherein the location code represents a location or segment of the traffic network relating to the information message;

a terminal to be carried by the road users while traveling within the traffic network and configured for receiving and outputting the information message generated by the generator of the traffic management center;

a data transmission system for transferring the information message from the traffic management center to the terminals, the data transmission system having a plurality of distribution devices strategically distributed about the traffic network and connected to the traffic management center for wired or wireless data transmission, each of the transmission devices including a transmit unit for wireless transfer of the information messages to respective the terminals within a local transmit area, wherein a given information message is to be transmitted explicitly based on the location code thereof specifically to one or more the distribution devices.

In other words, the objects of the invention are achieved with a traffic management system that has terminals that are carried about by the road users and that receive the information message for output to the user. The road user carries with them a mobile terminal, which forms an information receiver, especially a so-called smartphone or an on-board vehicle device, by means of which an appropriate application program for receiving and outputting information messages is able to be executed. In such cases the increasing availability of smartphones will be exploited in an advantageous manner for a comprehensive dissemination of information messages. The traffic management system further comprises data transmission means for transmitting information messages from the traffic management center to the terminal. In addition the means for central generation of an information message for road users is also embodied for geographical location of the information message by assigning a local code for destination-oriented transfer and/or output of the located information message. In such cases the local code represents a location or section of the traffic network relating to the information message. The data transmission means has a number of distribution devices arranged strategically distributed in the traffic network, which are connected for wired and/or wireless data transmission to the traffic management center and each have a transmit unit for wireless transmission of information messages to terminals within a local transmit area, wherein an information message is able to be transmitted explicitly on the basis of its location code to one or more distribution devices. The core of the inventive traffic management system lies in a geographically-selected, explicit information transmission directly to the road user in moving traffic, for example in a vehicle. The proposed traffic management system includes the entire process chain of data input, data processing, data transmission and data output and thereby represents an integrated element of traffic management. Its inclusion in the strategy module of the traffic management system makes possible tailored, content-consistent information via various information channels such as for instance speech radio, roadside information displays, the Internet or the RDS/TMD service, which leads to synergy effects. The invention advantageously makes use of information and expert knowledge already available in a traffic management center, in order to provide the road user with up-to-date information and to strategically influence the traffic. The operator in the traffic management center knows the neuralgic points in the traffic network of the town or of the conurbation, planned events and interventions into the traffic through blockages or roadworks, the associated parking space and also the current traffic situation. This makes a networked consideration of the traffic possible and a definition based thereon of the information message contents. Above all the traffic infrastructure operators such as towns and municipalities and event organizers of trade fairs and large sporting and cultural events for example might come into consideration as users of the inventive traffic management system. Cable and Ethernet or mobile radio, especially the packet-switched radio data transmission service, abbreviated to GPRS, might be considered as options for the data transmission interface between the traffic management center and the roadside distribution devices. The distribution devices are installed at strategically important points in the traffic network, on main access roads, on tunnels, at trade fairs sites, sports arenas, zoos and the like and comprise a receive unit for the information messages and a transmit unit with a local transmit area which can especially be embodied as an WLAN transmitter and which serves to emit the information messages locally around the distribution device. An explicit transmission of the information messages to the various distribution devices takes account of the respective network sections on which a city hotspot has influence. Thus a reduction of the information is undertaken in accordance with the geographical relevance. The terminal and the application program able to be executed on said terminal are embodied for receiving information messages, for filtering said messages in accordance with personal preferences and directions of movement and for acoustic and/or optical output of the information message. With a WLAN solution there are no communication costs and no Internet connection is required.

In an advantageous embodiment of the inventive traffic management system the generation means has a manual input interface for an operator for editing an information message and for assigning the location code. An editing workstation in the traffic management center serves to generate and geographically locate the information message as free text for example. The free provision of the information makes great flexibility and a greater level of detail compared to known TMC messages or messages on dynamic information boards possible. In addition to the text message, the transmission of map diagrams and graphically-edited content is also possible, which can be retrieved in addition to an acoustic output.

In a preferred embodiment of the inventive traffic management system the generation means is embodied to automatically create and locate an information message as a function of a current traffic situation detected in the traffic network. In the strategy module of the traffic management center information can be embedded into a largely automated message management, including the assignment of specific message contents to the various locations or network sections. With recurring events, predefined, situation-dependent information messages can be provided in advance in the strategy module, so that their automatic activation is possible and the load on the operator at work is reduced.

In an alternate preferred embodiment of the inventive traffic management system the data transmission means has a central interface to the Internet, wherein the terminal includes a mobile interface to the Internet, positioning means for determining the terminal position in the traffic network and filter means for explicit output of a received information means on the basis of its location code and direction of movement. The traffic management center provides information messages via the Internet here, which are provided via their location with a spatial validity area. Information messages are requested via mobile radio through an application program running on the terminal. The relevant information messages are selected for the road user on the basis of the GPS position of the terminal via filter means in the terminal. These filter functions make it possible for the road user to filter the information messages in accordance with their own preferences, for example no information about downtown or no information about a specific event.

In an advantageous embodiment of the inventive traffic management system the traffic management center is able to be supplied with traffic data, especially traffic densities and average speeds, by traffic detectors installed in the traffic network, wherein the generation means is embodied to create an information message with a current traffic situation from the traffic data. This enables traffic-related overloads in the downtown area or traffic disruptions at positions in the road network of significance for traffic to be notified to road users involved.

In a further advantageous embodiment of the inventive traffic management system the traffic management center is able to be supplied with occupation data detected by parking facilities linked to the traffic network, especially from multi-storey parking lot or parking ticket machine control centers, wherein the creation means is embodied to create from the occupation data an information message with the current parking space situation. A message about overloading of the parking facilities in the downtown area for example enables road users to consider alternative options of diverting to parking facilities in edge zones, with a short-range transit connection for example.

In yet another advantageous embodiment of the inventive traffic management system the traffic management center is able to be supplied with environmental data, especially pollution level or temperature measurement data, by environmental sensors installed in the traffic network, wherein the creation means is embodied to create an information message with a current environmental situation from the environmental data.

The notified environmental situation can also contain ozone values in the city for example.

In another advantageous embodiment of the novel traffic management system the traffic management center is able to be supplied with event data provided by administration systems from events taking place in the traffic network, especially from trade fairs or sporting events, especially recommended arrival and departure routes, wherein the creation means is embodied to create from the event data an information message with current event information. An information message can for example contain the name, location, duration and opening times of an event, as well as assigned parking options and route recommendations for arrival and departure.

Other features which are considered as characteristic for the invention are set forth in the appended claims.

Although the invention is illustrated and described herein as embodied in Traffic Management System, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a diagrammatic view of a traffic management system according to the invention.

DETAILED DESCRIPTION OF THE INVENTION

Referring now to the FIGURE of the drawing in detail, the novel traffic management system 1 comprises a traffic management center 2 for a road network of a city. The traffic management center 2 has an information message generator 3, or means 3 for creating information messages IM1, IM2, . . . , IMn for road users. These are especially those on the move in a vehicle in the road network. To create information messages IM1, IM2, . . . , IMn the traffic management center 2 is supplied with information data on which the generator 3 for generating information messages IM1, IM2, . . . , IMn is based.

The information data can involve traffic data, especially traffic density information and average speeds, which are detected by the traffic detectors installed at measurement intersections in the road network, from which information messages IM1, IM2, . . . , IMn with a current traffic situation for specific locations, routes or sections of the road network are generated. In such cases the data can likewise involve occupation data of parking spaces, especially of multi-story parking garages and parking lots and automatic parking ticket machine control centers, from which information messages IM1, IM2, . . . , IMn are created with a current parking space situation at particular locations or sections within the road network. The information data can further involve environmental data, especially measurement data about pollution levels or weather variables, which is detected by environmental sensors disposed in the city, from which information messages IM1, IM2, . . . , IMn with a current environmental situation are created. In addition it can involve event data, especially recommended route data for arrival and departure, which is created by administration systems of events taking place in the city, such as sporting events or trade fairs, from which information messages IM1, IM2, . . . , IMn with current event information are created.

To create the information messages IM1, IM2, . . . , IMn a manual input interface 4 for an operator 6 that is embodied as an editing workstation is available in the traffic management center 2. This allows free text to be edited, for example, or for pre-prepared message texts to be selected from a library. An information message IM1, IM2, . . . , IMn can also be created in a largely automated manner, for example as a function of a currently detected traffic situation, wherein the creation means 3 interact here with a strategy module 5 of the traffic management center 2.

In accordance with the invention an information message IM1, IM2, . . . , IMn is geographically located by means of the generator 3, in that a location code is assigned to said message, which represents a location or section of the road network relating to the information message IM1, IM2, . . . , IMn. The location code makes it possible to transfer and/or output the information message in a destination-oriented way, which has the local relevance or the local-spatial influence of the information to be notified. Determining the location can be done manually or also in an automated manner.

The traffic management center 2 has an output interface (TX) 7 to which a data transmission system 8, or data transmitter 8, is connected. The coupling may be by way of cables, Ethernet or mobile radio, for example, and allows to transfer the centrally created information messages IM1, IM2, . . . , IMn to terminals 11 carried by road users. For this purpose distribution devices 9 are disposed in the road network at traffic-relevant locations, for example in the area of event locations, on main access roads to the city and to its downtown area, on sections of road where there is a danger of traffic congestion, on tunnels and the like, which each have a transmit unit 10 with a local transmit area ranging between 50 m and 300 m for example. A transmit unit 10 can be embodied for example as a WLAN transmitter. Distribution devices 9 at a specific location or within a specific location area of the road network receive information messages IM1, IM2, . . . , IMn with corresponding location code and transmit these wirelessly in their transmit area. This enables information messages IM1, IM2, . . . , IMn to be transmitted explicitly on the basis of their location code to one or more distribution devices 9, from where they are transferred to terminals 10 which are located in the transmit area of the respective distribution devices 9 and are thus located in a local area for which the transmitted information message has relevance.

The terminals 11 may be embodied in a variety of ways, such as in smartphones or in on-board vehicle devices. That is, the terminals 11 can be equipped with data-processing and radio communication means, on which an application program 12 for receiving and outputting information messages IM1, IM2, . . . , IMn is able to be executed. The information message IM1, IM2, . . . , IMn can be output acoustically via a loudspeaker and/or optically on a display unit. The application program 12 allows personal settings of the specific user to be entered, for filtering information messages IM1, IM2, . . . , IMn according to pre-specifiable criteria, such as no information about downtown, no information about a specific event or the like.

The novel traffic management to some extent incorporates existing components of a traffic management center, keeping the investment costs for an operator low. The cost is substantially restricted to the distribution devices, an expansion module in the traffic management center, and the writing and provision of the application program for the terminal.

The invention claimed is:

1. A traffic management system for providing traffic information and for controlling and influencing traffic in a traffic network, the traffic management system comprising:

a traffic management center including a generator for centrally creating an information message for road users, said generator being configured to localize the information message by assigning a location code for destination-oriented transfer and/or output of the localized information message, wherein the location code represents a location or segment of the traffic network relating to the information message;

a terminal to be carried by the road users while traveling within the traffic network and configured for receiving and outputting the information message generated by said generator of said traffic management center;

a data transmission system for transferring the information message from said traffic management center to said terminals, said data transmission system having a plurality of distribution devices strategically distributed about the traffic network and connected to said traffic management center for wired or wireless data transmission, each of said transmission devices including a transmit unit for wireless transfer of the information messages to respective said terminals within a local transmit area, wherein a given information message is to be transmitted explicitly based on the location code thereof specifically to one or more said distribution devices.

2. The traffic management system according to claim 1, wherein said generator includes a manual input interface for an operator for editing an information message and for assigning the location code to the message.

3. The traffic management system according to claim 1, wherein said generator is configured to create and locate an information message automatically as a function of a traffic situation currently detected in the traffic network.

4. The traffic management system according to claim 1, wherein said data transmission device includes a central interface to the Internet, and wherein each said terminal has a mobile interface to the Internet, positioning means for determining a current position of the terminal in the traffic network and a filter for explicit and directed output of a received information message based on the location code of the information message.

5. The traffic management system according to claim 1, wherein said traffic management center is configured to receive traffic data detected by traffic detectors installed in the traffic network, and said generator is configured to create from the traffic data an information message with a current traffic situation.

6. The traffic management system according to claim 5, wherein the traffic data detected by traffic detectors includes localized traffic densities and average speeds.

7. The traffic management system according to claim 1, wherein said traffic management center is supplied with occupation data detected by parking facilities linked to said traffic network, and said generator is configured to create from the occupation data an information message with a current parking space situation.

8. The traffic management system according to claim 7, wherein the parking facilities linked to said traffic network are multi-story parking garages, parking lots, or automatic parking permit centers.

9. The traffic management system according to claim 1, wherein said traffic management center is supplied with environmental data detected by environmental sensors installed in the traffic network, and said generator is configured to create from the environmental data an information message with a current environment situation.

10. The traffic management system according to claim 9, wherein the environmental data detected by environmental sensors includes pollution level data or temperature measurement data.

11. The traffic management system according to claim 1, wherein said traffic management center is supplied with events data provided by organizers of events impacting the traffic network, and wherein said generator is configured to create from the events data an information message with current information about events.

12. The traffic management system according to claim 1, wherein the events data is selected from the group consisting of trade fairs, exhibits, sporting events, recommended arrival routes, and recommended departure routes.

13. The traffic management system according to claim 1, configured for managing a street network of a city.

* * * * *